United States Patent [19]

Brownfield et al.

[11] 4,394,818
[45] Jul. 26, 1983

[54] TRANSPORT REFRIGERATION UNIT WITH REMOVABLE POWER PACK FRAME

[75] Inventors: Jerry A. Brownfield, Minneapolis; Richard J. Sandberg, Bloomington; Thomas J. Niemi, Minneapolis; Leland L. Howland, Bell Plaine, all of Minn.

[73] Assignee: Thermo King Corporation, Minneapolis, Minn.

[21] Appl. No.: 302,901

[22] Filed: Sep. 16, 1981

[51] Int. Cl.³ .............................................. B60H 3/04
[52] U.S. Cl. ....................................... 62/239; 62/236; 62/263; 62/448
[58] Field of Search ...................... 62/323.1, 448, 239, 62/263, 323.3, 236, 262

[56] References Cited

U.S. PATENT DOCUMENTS

| | | | |
|---|---|---|---|
| 3,415,072 | 12/1968 | White | 62/239 |
| 3,512,373 | 5/1970 | White | 62/236 X |
| 3,602,006 | 8/1971 | Metcalfe et al. | 62/262 |
| 3,871,188 | 3/1975 | Vold et al. | 62/448 X |
| 4,075,867 | 2/1978 | Seipp | 62/236 X |
| 4,182,134 | 1/1980 | Viegas et al. | 62/448 X |

Primary Examiner—Lloyd L. King
Attorney, Agent, or Firm—E. C. Arenz

[57] ABSTRACT

A transport refrigeration unit for mounting on the front face of a trailer 1 or the like is provided with an exterior section 2 construction and arrangement in which a relatively low center of gravity is obtained by providing a frame means 25 in the lower portion of the exterior section mounting an internal combustion engine 26 at a relatively low level with a refrigerant compressor 27 at a somewhat higher level, and an electric motor 28 below the compressor when such a motor constitutes a part of the power pack, these elements being arranged so that the driving belts and pulleys in the lower part of the section are in the center portion of the section to promote their accessibility, and a significant open area is provided above the power pack to promote access to those parts in the upper portion of the exterior section behind the condenser 9.

7 Claims, 7 Drawing Figures

TRANSPORT REFRIGERATION UNIT WITH REMOVABLE POWER PACK FRAME

BACKGROUND OF THE INVENTION

The invention pertains generally to the art of transport refrigeration units and in particular to that part of the art relating to component and structural arrangements for such units.

There are a number of obviously desirable characteristics which those in the business of manufacturing transport refrigeration units would like their units to have. For example, there are continuing efforts to reduce certain dimensions and the weight of units, to improve accessibility for servicing and provide arrangements which facilitate service including that of major power parts, and also to provide arrangements which permit relative ease of manufacturing and at a reasonable cost. Finally, the transport units provided in whatever arrangement must have adequate capacity for their intended purpose.

The aim of this invention is to provide a transport refrigeration unit having a construction and arrangement, and in particular that of the exterior section of the unit, which possesses the various desirable characteristics noted above.

In particular, it is the aim of the invention to provide a unit in which the power pack arrangement is located in the exterior section in an arrangement which promotes a low center of gravity for the unit as a whole, and which permits the removal of all of the power components (comprising an internal combustion engine, a refrigerant compressor, and an electric motor when used), as a single unit forwardly from the exterior section. It is also an objective with that arrangement that the frame means mounting the power elements be supported such that a plane through the supports is not significantly displaced from the axis of gyration of the internal combustion engine. The frame means itself is of a construction which is not of undue weight but is relatively rigid and strong to promote stabilization of the active components mounted on it. Also, the arrangement of components is such that the exterior section is relatively higher but narrower in depth than the comparable commercial prior art unit, and in which those parts in the top and in the bottom of the exterior section may be considered to be spaced apart further to provide more central open space to promote accessibility to all of the parts.

The arrangement according to the invention also includes a belt drive arrangement which is different from that of the prior art of which we are aware and which is considered advantageous with respect thereto.

Patents which address themselves to other transport refrigeration units and which may be considered material in the sense of prior art of which we are aware with respect to this application are U.S. Pat. Nos. 4,182,134; 4,075,867; 3,941,012; 3,871,188; 3,323,625. However, none of these are considered to have teachings which disclose or suggest the overall arrangement of this invention.

SUMMARY OF THE INVENTION

The invention is embodied in a transport refrigeration unit of a conventional type that includes an exterior section adapted to be mounted on the front face of a transport trailer or the like, an interior section including a refrigerant evaporator projecting rearwardly from the top, rear part of the exterior section into the trailer, and including a refrigerant compressor and at least an internal combustion engine for driving the compressor. The invention provides an improved construction and arrangement of elements for the unit in which the exterior section is of generally rectangular box shape and of significantly greater height than width and includes a condenser-radiator generally vertically disposed at the upper front face of the exterior section, with the exterior section including means defining a front opening having a height from closely adjacent the bottom of the exterior section to closely adjacent the lower edge of the condenser and a width for substantially the width of the exterior section, with a power pack frame disposed in the lower portion of the exterior section for mounting independently at least both an internal combustion engine and the compressor at vertically displaced levels with the engine being disposed with its base at a substantially lower level than the level of the base of the compressor to promote a relatively low center of gravity of the exterior section, the engine and compressor being disposed with their output and input ends, respectively, projecting in opposite directions and with the compressor input end overlying the engine output end, and each of the ends including pulley means connected by belt means lying in a vertical plane transverse to the width of the exterior section for driving the compressor input from the engine, the power pack frame including an engine mount section including front and rear, bottom horizontal rails to which the engine is secured, and front and rear vertical gusset members of generally rhomboid shape extending from closely adjacent one side of the exterior section for a major part of the length of the frame means and having the engine mounted in nested relation therebetween, the frame means including upper rail means extending from the gusset members to adjacent the other side of the exterior section with the upper rail means supporting means for mounting the compressor thereon.

Additional features of the arrangement according to the invention will be described hereinafter.

However, among the features of the invention provided by the arrangement is that an electric motor to provide an alternate drive for the compressor can be mounted in depending relation from the frame below the compressor with the output ends of the electric motor and internal combustion engine facing each other, both driving elements being coupled to compressor pulleys by belt arrangements in which the belts are in a plane transverse to the width of the exterior section, the power pack frame means is mounted in shock absorbing relation to the exterior section at opposite ends and at different levels so that a plane through the mounting is reasonably close to the axis of gyration of the engine, and the power pack frame means includes a unitary structure which has a sideways dimension relative to the exterior section less than the width of the access opening so that the frame means can be moved forwardly as a unit with the engine, compressor, motor and coupling means therebetween remaining in their mounted relation thereon.

DESCRIPTION OF THE PREFERRED EMBODIMENT

Figure 1:
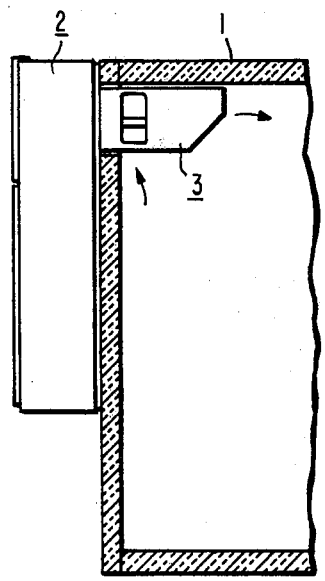
FIG. 1 is a side elevation in the nature of an outline view showing the transport refrigeration unit in its mounted relation on the front wall of a refrigerated truck or trailer body.

In FIG. 1 a fragmentary front end portion of a truck or trailer body 1 to be refrigerated is shown with the refrigeration unit mounted thereto on the front face of the body. The unit basically includes an exterior section 2 and an interior section 3 which projects into the body and functions to recirculate air as indicated by the directional arrows from the served space through the refrigerant evaporator (not shown) for purposes of cooling and/or heating the load in the served space in accordance with the demand.

Figure 2:
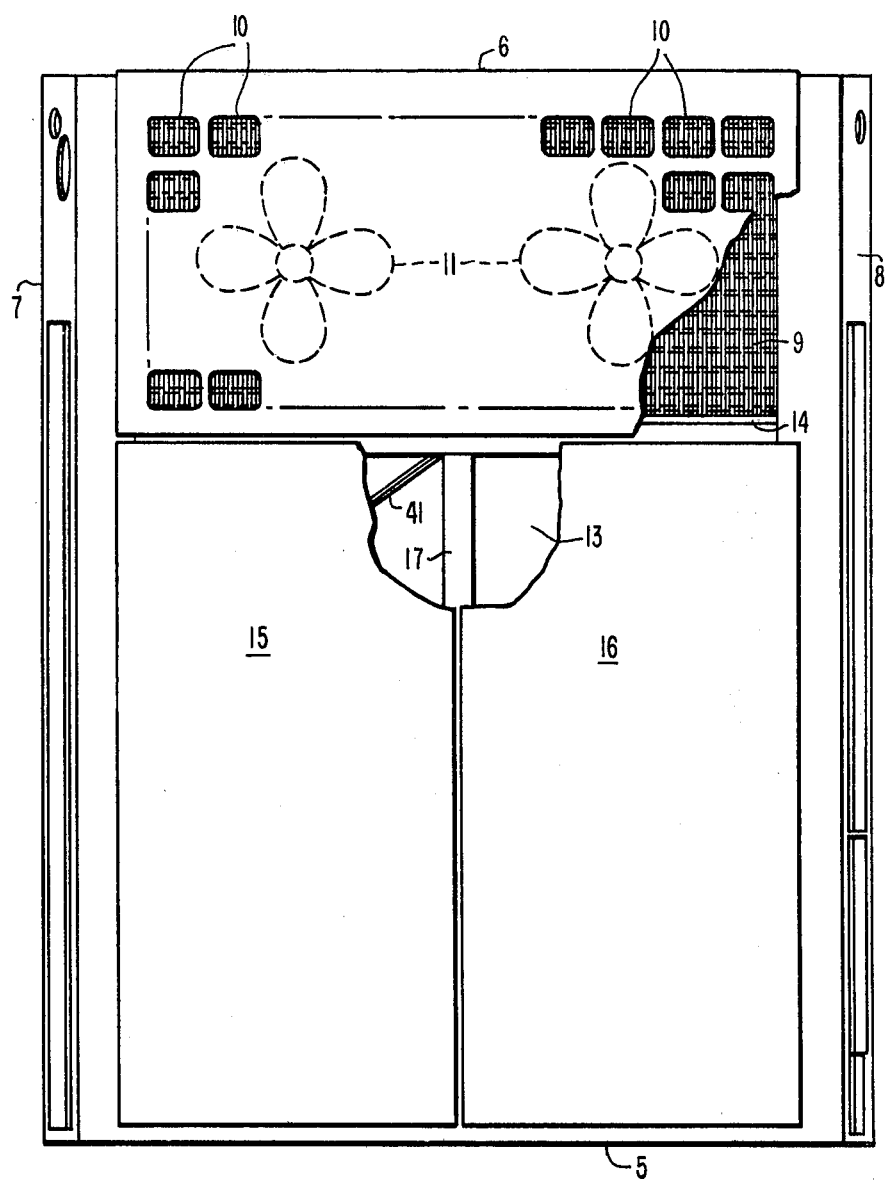
FIG. 2 is a partly-broken front view of the exterior section of the unit.

In FIG. 2, additional detail regarding the exterior section is seen as viewed from the front, the exterior section being of generally rectangular box shape and of significantly greater height than width so that, as will be explained hereinafter, a relatively lower center of gravity is obtained as compared to a predecessor commercial prior art unit. The exterior section has a bottom 5 which is substantially open, top 6 which is also substantially open, and one side 7 with a door at the left and the other or opposite side 8 with its door at the right. These sides 7 and 8 diverge to a slight degree away from each other in a front to rear direction for aerodynamic and aesthetic reasons, but the exterior section is still considered to be of generally rectangular box shape as noted before.

The refrigerant condenser 9 (which includes an integral engine radiator) is located in the upper front part of the exterior section and is generally vertically disposed with an openwork grille 10 at the front face of the condenser to permit the flow of air therethrough as created by a pair of condenser fans 11.

The exterior section also includes means defining a front opening 13 which has a height from closely adjacent the bottom 5 of the exterior section, to closely adjacent the lower edge 14 of the condenser 9, and a width for substantially the width of the front of the exterior section, that is, from one side 7 to the other side 8. This front opening 13 is, on the illustrated unit, very close to being square in outline and is covered by access doors 15 and 16 hinged along their vertical outer edges so that they can be swung fully open. A vertical center stop 17 is provided in the access opening 13, this stop being bolted at top and bottom to the top and bottom frame portions of the front opening and is thus relatively easily removable.

Figure 3:
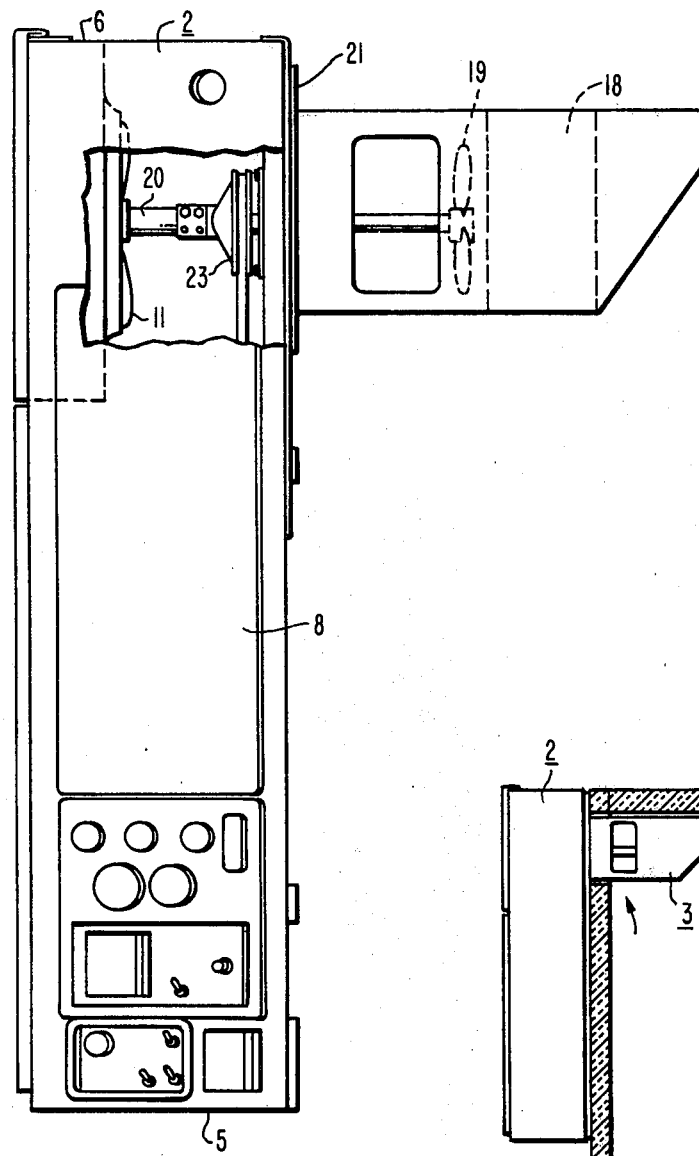
FIG. 3 is a partly-broken side view of a unit.

Referring to FIG. 3, the interior section 1 which projects rearwardly from the top, rear part of the exterior section 2 includes a refrigerant evaporator 18 and a pair of evaporator fans 19 (only one of which is seen in FIG. 3). Each of the evaporator fans 19 is on a shaft 20 which is common to a condenser fan 11, the shafts being supported at an intermediate location from the upper rear wall 21 of the exterior section and with the left and right shafts having pulleys 22 and 23, respectively, (FIG. 4) mounted thereon.

Figure 4:
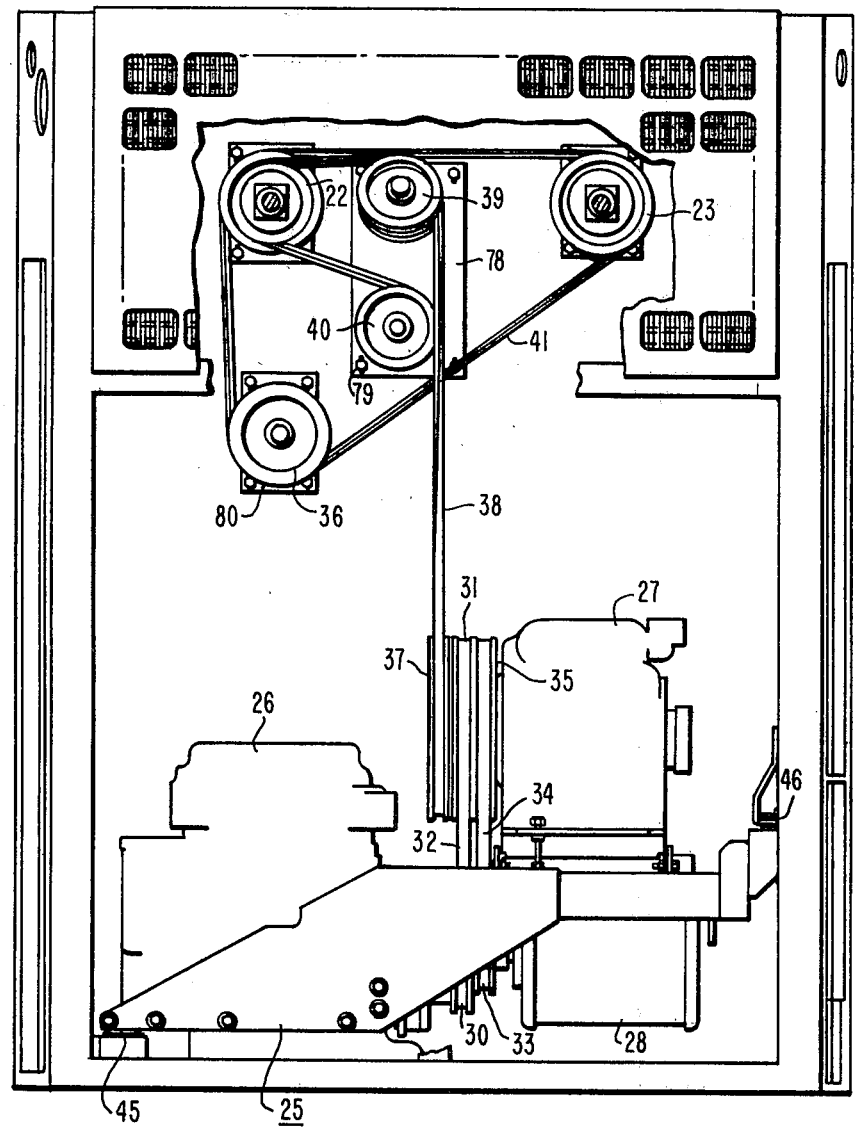
FIG. 4 is a front elevation of the exterior section, partly broken, and with the front access covers omitted and a portion of the condenser broken away to illustrate the overall arrangement of components important in the inventive arrangement.

Major active components of the arrangement providing the features of the invention are illustrated in the exterior section 2 in FIG. 4 in which the front is partly broken and the access doors 15 and 16 (FIG. 3) are omitted.

The power pack frame means generally designated 25 is located in the lower part of the exterior section 2 and supports or carries an internal combustion engine 26 at the left, a refrigerant compressor 27 at the top right and, when an electric standby alternate power source is desired, an electric motor 28 in the space below the compressor 27. Details of the power pack frame means 25 will be described hereinafter in connection with FIGS. 5-7. However, it will be appreciated from FIG. 4 that the engine 26 is mounted at a significantly lower level than the compressor 27. The base of the engine is secured to the frame means approximately at the lower edge of the base 25 while the compressor 27 base is at the upper level of the frame means 25. Since the ratio of the weight of the engine to the compressor may run in the neighborhood of 2½ to 1, this arrangement promotes a lowered center of gravity of the unit while providing a standard arrangement which can accommodate the electric motor in the space below the compressor and, when no motor is used, the space accommodates a relatively heavy battery (not shown). Alternately the electric motor 28 at the relatively low level illustrated promotes the lowered center of gravity when the electric motor is used. It is contemplated that in all cases the internal combustion engine 26 will be present for driving the compressor 27, with the electric motor 28 simply being an add-on in some cases. It is not considered likely that there will be instances where the engine 26 will be omitted and only the electric motor 28 will be present for driving the compressor.

It will be noted that the engine 26 and the compressor 27 are disposed with their output and input ends, respectively, projecting in opposite directions and with the compressor input end overlying the engine output end. Specifically, the engine output comprises a clutch with a pulley 30 thereon coupled to a first pulley 31 on the compressor by a first belt 32.

The electric motor 28 is coupled to drive the compressor 27 through its output pulley 33 coupled by a second belt 34 to the second pulley 35 of the compressor input end.

The fans for the evaporator and condenser, and an electric alternator 36 are belt driven off a third pulley 37 mounted on the input end of the compressor and rotatable with the first and second input pulleys 31 and 35. A third belt 38 passes from the front circumference of the pulley 37 up to a first idler pulley 39, thence to the double-sheaved pulley 22 and back to second idler 40 and down to the rear circumferential part of the pulley 37 of the compressor. A fourth belt 41 couples the second sheave of the pulley 22 to a pulley on the alternator 36 and the pulley 23 for driving the shaft of the right hand evaporator and condenser fans.

It is to be particularly noted that the pulleys and belts for driving the compressor 27 from either the engine 26 or motor 28, along with the power take-off pulley 37 are centrally disposed with respect to the sideways dimension of the exterior section, and lie in vertical planes which are transverse to the width of the exterior section. This is considered a distinctly advantageous feature according to the invention, in contrast to an arrangement in which the engine and compressor, for example, are disposed with their output and input shafts both projecting toward the rear of the unit and thus resulting in a belt arrangement lying in vertical planes generally parallel to the rear face of the exterior section and behind the engine and compressor. Some such arrangements are considered disadvantageous also in that when an electric motor is omitted, a separate jack shaft and idler pulley is frequently required. In the case of an arrangement according to this invention, omission of the electric motor 28 simply results in the omission of the second belt 34 with no requirement for an additional jack shaft. Finally, the orientation arrangement of drivers and compressor promotes a shallow depth of the exterior section.

In accordance with another feature of the invention, the frame means 25 (FIGS. 4 and 5) is mounted in shock absorbing relation to the exterior section and with the mounting means being located adjacent the opposite sides of the section and being vertically displaced so that a plane passing through the shock absorbing mounting means is reasonably near the axis of gyration of the engine 26. To this end, the left mount includes front and rear shock absorbers 45 at the left end of the frame means 25 and closely adjacent the bottom of the section. The right shock absorbers 46 at the front and rear of the frame means are at a significantly higher location corresponding generally to the level of the base of the compressor 27.

Figure 5:
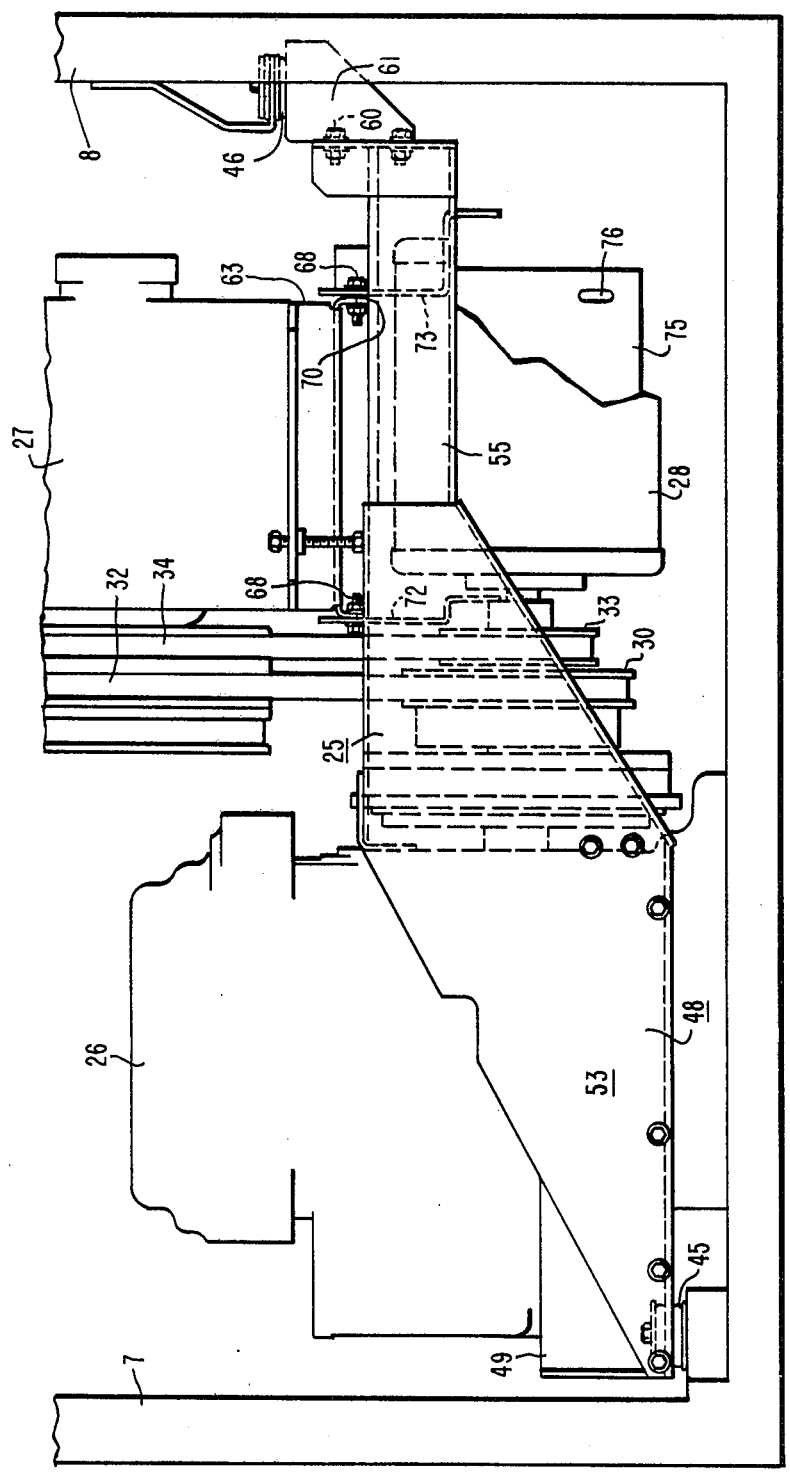
FIG. 5 is a front elevation of the power pack frame means, with portions of the exterior section adjacent the frame means being shown as well.
Figure 7:
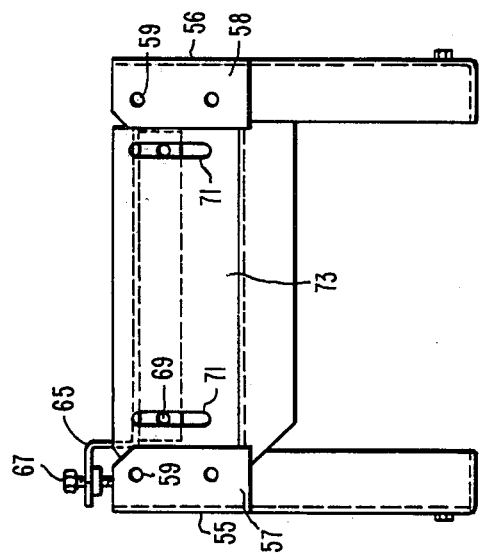
FIG. 7 is an end view of the frame as seen from the right of the frame.
Figure 6:
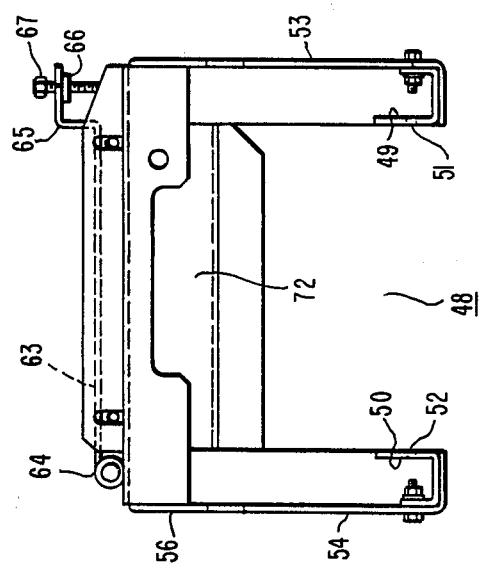
FIG. 6 is an end view of the frame as seen from the left of the frame.

Turning now to FIGS. 5-7, details relating to the structure of the power pack frame means will be described. The power pack frame means generally designated 25 includes an engine mount section generally designated 48 and includes front and rear bottom horizontal rails 49 and 50, respectively, between which the engine 26 is secured as by fasteners (not shown) but located as at 51 and 52 (FIG. 6).

The engine section 48 includes front and rear vertical gusset members 53 and 54, both of which are of generally rhomboid shape in face view, and each of which extends from closely adjacent the one side 7 of the exterior section (with the frame means installed) for a major part of the length of the frame means. The remaining extent of the frame means from the righthand end of the gusset members 53 and 54 comprise front and rear rail means 55 and 56, respectively, and extend at the upper level from a welded connection at the right-hand end of the gusset members to adjacent the other side 8 of the section when the frame means is installed in the section. At the right end of the upper rails 55 and 56, as seen in FIG. 7, a pair of angles 57 and 58 are secured to the front and rear rails, respectively. The legs of the angles 57 and 58 which lie in a common plane are provided with fastener openings 59 through which fasteners 60 (FIG. 5) are used to attach the frame means at the right end to a front to rear extending bracket 61 which is, in turn, connected to the exterior section through the shock absorber 46.

Remaining with FIG. 5, it may be seen that with the removal of the fasteners 60 and the disconnection of the mounting at the shock absorbers 45, the unitary portion of the frame has a length which permits it to be moved forwardly as a unitary structure out of the exterior section for maintenance, repair or the like.

As shown in FIGS. 5-7, a generally horizontal platform 63 for mounting the compressor 27 is provided. The cross-section of the platform is probably best seen in FIG. 6 and includes a rolled rear edge 64 which permits the platform to be hinged from the rear upper rail 56. The front edge of the platform is flanged upwardly and forwardly as at 65 and is provided with a threaded weld nut 66 at its forward flange to receive an adjustment bolt 67, the bottom end of which bears against the upper forward edge of the mounting means for adjusting the forward edge of the compressor platform in a vertical direction. This permits the adjustment of the tension of the first belt 31 between the compressor 27 and the engine 26. Once the adjustment is made, the compressor is fixed in that position by means of four fasteners 68 which pass through openings 69 (FIG. 7) in the opposite down-turned flanges 70 of the platform and through slotted openings 71 in the front to rear extending stiffener members 72 and 73 having vertical legs closely adjacent the down-turned flanges 70 of the platform.

For mounting the electric motor 28 (FIG. 5) a rear mounting plate 75 has its upper end fixed to the upper rear rail 56 and depends therefrom. It is provided with four slotted holes 76 (one shown) to permit a conventional motor base (not shown) to be mounted to the plate, and adjusted upwardly or downwardly so as to provide the proper belt tension in the second belt 34.

As should be clear from the foregoing description, the belt tension of the first belt 32 between the engine 26 and the compressor 27 is adjusted by pivoting the compressor platform up or down through operation of the adjusting bolt 67. If an electric motor is used, it is shifted up or down on its baseplate 75 to provide the correct belt tension. The proper belt tension for the third belt means 38 (FIG. 4) which passes around the two idlers 39 and 40, is obtained by shifting the plate 78 upon which the two idler pulleys are mounted, upwardly or downwardly, as is permitted with the slotted holes 79 in the idler plate. A similar arrangement is provided for the alternator plate 80 upon which the alternator is mounted so that the fourth belt 41 can be adjusted in tension.

A summary of the major features of the arrangement and construction providing features of the invention is perhaps best seen in FIG. 4. It will be apparent that the power pack frame means 25, mounting all of the main power elements, is of a standardized construction which promotes the low center of gravity with any arrangement of power elements. It also permits the vertically displaced shock absorbing mounting arrangement and permits the unitary frame to be withdrawn directly forwardly from the exterior section with the power elements remaining thereon. The construction is such that the elements are mounted to place the belts and pulleys in a center portion of the exterior section.

FIG. 4 also makes it clear that there is significant open space in the area above the power pack frame means and its mounted elements which promotes somewhat easier access to the parts which are in the upper portion of the exterior section and behind the condenser and radiator. It will of course be appreciated that there are a number of elements related to the refrigeration system such as lines, accumulator and so on which will take up part of the relatively open space above the power pack, but these do not severely limit the access to the upper portion of the exterior section.

We claim:

1. In a transport refrigeration unit including an exterior section adapted to be mounted on the front face of a transport trailer or the like, an interior section including a refrigerant evaporator adapted to project rearwardly from the top, rear part of said exterior section into said trailer, and including a refrigerant compressor and at least an internal combustion engine for driving said compressor, a construction and structural arrangement of elements for said unit comprising:

said exterior section is of generally rectangular box shape and of significantly greater height than width, and includes a refrigerant condenser generally vertically disposed at the upper front face of said exterior section;

said exterior section includes means defining a front opening having a height from closely adjacent the bottom of said exterior section to closely adjacent the lower edge of said condenser, and a width for substantially the width of said exterior section;

power pack frame means disposed in the lower portion of said exterior section for mounting, in separated relation and independently, at least both said engine and said compressor at vertically displaced levels, said engine being located with its base at a substantially lower level than the level of the base of said compressor;

said engine and compressor being disposed with their output and input ends, respectively, projecting in directs toward each other and with the compressor input end overlying said engine output end, each of said ends including first pulley means connected by first belt means lying in a vertical plane transverse to the width of said exterior section for driving said compressor input means from said engine when it operates;

said power pack frame means includes an engine mount section including front and rear bottom horizontal rails to which said engine is secured, and front and rear vertical gusset members of generally rhomboid shape extending from closely adjacent one side of said exterior section for a major part of the length of said frame means and having said engine mounted in nested relation therebetween, said frame means including upper rail means extending from said gusset members to adjacent the other side of said section, said upper rail means supporting compressor mounting means.

2. A construction and arrangement according to claim 1 including:

an electric motor for providing a drive for said compressor alternately to said engine;

said electric motor is mounted in depending relation from said frame means below said compressor, and with the output shaft of said motor generally facing the output end of said engine; and a second pair of pulleys on said motor output shaft and on said compressor input end and coupled by second belt means lying parallel to said first belt means.

3. An arrangement according to claim 2 including:

a pair of spaced-apart fan drive shafts in the upper part of said exterior section, each shaft having a condenser fan and an evaporator fan at opposite ends thereof and an intermediately located pulley thereon, said fan shaft pulleys lying in a generally vertical plane normal to the vertical planes of said first and second belt means;

a third pulley on said input end of said compressor and fixed to rotate with said first and second pairs of pulleys;

third belt means coupling one of said fan pulleys to said third pulley; and fourth belt means coupling said one of said fan pulleys to the other of said fan pulleys.

4. An arrangement according to claim 1 including:

means for mounting said power pack frame means in shock absorbing relation to said exterior section closely adjacent one side thereof at a level closely adjacent the base of said engine, and closely adjacent said other side of said exterior section at a level about as high as the base of said compressor, so that a plane passing through said mounting means is not substantially displaced from the axis of gyration of said engine.

5. An arrangement according to claim 1 wherein:

said power pack frame means includes a unitary structure separable as a whole from said exterior section and having a sidewise dimension, relative to said exterior section, less than the width of said access opening to permit said frame means to be removed forwardly with the power pack components comprising at least said engine and compressor remaining in mounted relation therewith.

6. In a transport refrigeration unit including an exterior section adapted to be mounted on the front face of a transport trailer or the like, an interior section including a refrigerant evaporator adapted to project rearwardly from the top, rear part of said exterior section into said trailer, and including a refrigerant compressor and at least an internal combustion engine for driving said compressor, a construction and structural arrangement of elements for said unit comprising:

said exterior section is of generally rectangular box shape and of significantly greater height than width, and includes a refrigerant condenser at the upper front face of said exterior section;

said exterior section includes means defining a front opening having a height from closely adjacent the bottom of said exterior section to closely adjacent the lower part of said condenser, and a width for substantially the width of said exterior section;

unitary power pack means, separable from said exterior section, and including an engine mount portion and a compressor mount portion, and of a widthwise dimension, including said engine and said compressor mounted thereto, relative to said front opening to permit the forward withdrawal of said power pack means therethrough;

said power pack means being disposed in the lower portion of said exterior section and mounting, in separated relation and independently, at least both said engine and said compressor at vertically displaced levels, said engine being mounted at said engine mount portion with its base at a substantially lower level than the level of the base of said compressor mounted at the compressor mount portion; and said engine and compressor are disposed with their output and input ends, respectively, projecting in directions toward each other and with the compressor input end overlying said engine output end, each of said ends including first pulley means connected by first belt means lying in a vertical plane generally transverse to, and in the center portion relative to, the width of said exterior section for driving said compressor input means from said engine when it operates.

7. A construction and arrangement according to claim 6 including:
an electric motor for providing a drive for said compressor alternately to said engine;
said electric motor is mounted in depending relation from said power pack means below said compressor, and with the output shaft of said motor generally facing the output end of said engine; and
a second pair of pulleys on said motor output shaft and on said compressor input end and coupled by second belt means lying parallel to said first belt means.

* * * * *